US009098255B2

United States Patent
Peng

(10) Patent No.: US 9,098,255 B2
(45) Date of Patent: Aug. 4, 2015

(54) STOPPING MECHANISM

(75) Inventor: Po-Hsuan Peng, Hsinchu County (TW)

(73) Assignee: Getac Technology Corporation, Hsinchu County (TW)

( * ) Notice: Subject to any disclaimer, the term of this patent is extended or adjusted under 35 U.S.C. 154(b) by 240 days.

(21) Appl. No.: 13/243,997

(22) Filed: Sep. 23, 2011

(65) Prior Publication Data

US 2012/0152054 A1  Jun. 21, 2012

(30) Foreign Application Priority Data

Dec. 15, 2010  (CN) .......................... 2010 1 0601806

(51) Int. Cl.
*H05K 5/00* (2006.01)
*G06F 1/18* (2006.01)
*G06F 1/16* (2006.01)
*G11B 33/12* (2006.01)

(52) U.S. Cl.
CPC .............. *G06F 1/187* (2013.01); *G06F 1/1658* (2013.01); *G11B 33/124* (2013.01); *Y10T 74/20636* (2015.01)

(58) Field of Classification Search
CPC ............................... G06F 1/1658; G06F 1/187
USPC ....................... 361/679.57, 679.58
See application file for complete search history.

(56) References Cited

U.S. PATENT DOCUMENTS

| | | | |
|---|---|---|---|
| 6,332,658 B1 | 12/2001 | Sato et al. | |
| 6,340,078 B1 * | 1/2002 | Scheible | 188/166 |
| 7,724,537 B1 | 5/2010 | Grantham | |
| 7,848,099 B1 * | 12/2010 | Zhang et al. | 361/679.38 |
| 8,172,282 B2 * | 5/2012 | Lev et al. | 292/164 |
| 8,369,080 B2 * | 2/2013 | Huang | 361/679.38 |
| 8,437,132 B2 * | 5/2013 | Lin et al. | 361/679.58 |
| 2006/0146492 A1 * | 7/2006 | Reents et al. | 361/685 |
| 2009/0179435 A1 | 7/2009 | Lev et al. | |
| 2010/0031279 A1 | 2/2010 | Hsieh et al. | |
| 2010/0091454 A1 * | 4/2010 | Degner et al. | 361/679.58 |
| 2010/0294905 A1 * | 11/2010 | Peng et al. | 248/222.12 |
| 2012/0044654 A1 * | 2/2012 | Hsiu et al. | 361/747 |
| 2013/0147335 A1 * | 6/2013 | Chung | 312/334.47 |

FOREIGN PATENT DOCUMENTS

JP      2003256082 A     9/2003

* cited by examiner

*Primary Examiner* — Kristina Fulton
*Assistant Examiner* — Thomas Neubauer

(57) ABSTRACT

A stopping mechanism is disposed on a machine body and a removable device. The stopping mechanism includes a rectilinearly moving action member, a rotationally moving clipping member, and a stopping member fixedly disposed on the machine body, in which the action member pushes and presses against the clipping member so that the clipping member rotates to a holder position. The action member presses against the stopping member fixedly disposed on the machine body through a tilt angle relation at the holder position, so that an accelerating force generated by the removable device under impact is transferred to the machine body, thus dispersing the impact force.

8 Claims, 6 Drawing Sheets

STOPPING MECHANISM

BACKGROUND OF THE INVENTION

1. Field of Invention

The present invention relates to a stopping mechanism, and more particularly to a stopping mechanism arranged on a machine body for preventing an object in the machine body moving around or away from an opening of the machine body.

2. Related Art

With the fast development of electronic industry, the application range of various electronic devices is increasingly extensive. For example, desktop computers, notebook computers, tablet computers, digital cameras, and global position systems (GPSs) all become electronic devices favored by the public. In these electronic devices, in order to improve the convenience for use and operating efficiency, removable devices, for example, removable and replaceable battery packs, hard disk drives, optical disk drives, or other peripherals, are usually disposed on the electronic devices, so that a user can assemble or replace different removable devices by himself according to the requirements in use.

Generally, in the design of the electronic device, a plurality of openings for removing and replacing the removable devices is usually disposed on the machine body, so that the user can directly assemble and replace the peripherals through the openings without disassembling the machine body. For example, floppy drives, hard disk drives, various optical disk drives, or battery packs are assembled or disassembled through the openings, so that it is convenient for the user to assemble or disassemble the peripherals. On the other hand, in order to prevent dust or other foreign matters from entering the machine body through the openings, it is necessary to arrange a movable door panel at the openings, so as to open or close the openings through the reciprocating rotation and swing of the movable door panel relative to the machine body. Moreover, certain protection is provided without affecting the convenience of use, so as to prevent the removable peripherals from dropping out of the machine body from the openings.

However, for some electronic devices applied in a harsh or severe environment, for example, video players applicable to vehicles, or portable computers or rugged computers with military specifications, such movable door panel cannot provide the removable peripherals disposed in the machine body with appropriate protection. Since these electronic devices are always in an environment that easily shakes and is easily subjected to impact of external forces, and must have properties of crashworthiness and impact resistance, the requirements for reliability are relatively high.

The current solution to this problem is usually as follows: a hook structure is disposed at the opening of the machine body, or the movable door panel is replaced by a fixed door panel, so that the movable door panel presses against the removable device while closing the opening through the pull of the hook structure, or the fixed door panel directly closes the opening and presses against the removable device, so as to prevent the removable device from shaking to cause a short circuit of electrical signals between the removable device and the machine body, or to prevent the removable device moving away from the opening of the machine body through the direct pressing of the movable door panel or the fixed door panel.

However, since the movable door panel or the fixed door panel is disposed such that the panel directly presses against the removable device, when the machine body is subjected to impact of an unexpected external force, the external force directly acts on the door panel through the transmission of the removable device, and likewise, the instantaneous displacement between the removable device and the machine body is easily caused, thereby affecting the electrical signal transmission there-between. Meanwhile, since the removable device itself has a certain weight, when the machine body is subjected to the impact of the external force, gravitational acceleration toward the door panel is generated at the same time, which significantly increases the force of the removable device instantaneously acting on the door panel, so that the door panel finally fails to withstand the impact of the removable device and then is destroyed, and the removable device even separates from the machine body.

SUMMARY OF THE INVENTION

Accordingly, the present invention is a stopping mechanism, for alleviating the problem that a protection mechanism for preventing removable peripherals moving around or away from a machine body in the prior art fails to avoid that a short circuit of electrical signals is easily caused between the machine body and the removable device, and the removable device easily smashes up a door panel and drops out of the machine body when the machine body is subjected to impact of an external force.

The present invention provides a stopping mechanism, which is arranged on a machine body and a removable device. The machine body comprises an opening in communication with an inside of the machine body and a door panel pivotally connected to a side edge of the machine body adjacent to the opening, and the removable device is installed in the machine body through the opening. The stopping mechanism comprises a stopping member, a action member, and a clipping member. The stopping member is fixedly disposed in the machine body, the action member is rectilinearly movably disposed on the removable device, and the action member has a normal releasing position and a pressing position pressed against by the door panel. The clipping member is rotatably pivotally connected to the removable device, and the clipping member has a normal starting position and a holder position pressed against by the action member. Wherein, when the door panel is combined to close the opening, the door panel pushes the action member to displace to the pressing position, and the action member pushes the clipping member to rotate to the holder position. At the holder position, the clipping member presses against the stopping member, and has a tilt angle relation with the removable device, so that the removable device is clipped in the machine body through the tilt angle relation.

The efficacy of the present invention lies in that, after the removable device is installed in the machine body, and the door panel is combined to close the opening, through the tilt angle relation between the clipping member and the removable device, the removable device forms a support effect on the stopping member through the clipping member.

Therefore, when the removable device is subjected to impact of an unexpected external force in the machine body, force dispersion effect is produced between the removable device and the machine body through the clipping member, and most of the external force directly acts on the machine body, and thus the external force transmitted to the door panel is dispersed. In this way, the removable device is prevented from generating gravitational acceleration to act on the door panel, so that the removable device can be securely disposed in the machine body, and keep good electrical contact with the machine body.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention provides a stopping mechanism, which is disposed on a machine body of an electronic device and a removable device fitting in with the machine body. The electronic device may be, but is not limited to, an electronic device in which a second set of batteries, a hard disk drive, an optical disk drive, or other peripherals may be additionally arranged such as a notebook computer, an industrial computer, a tablet computer, a digital camera, or a GPS.

The peripherals are firstly loaded on a removable bracket, and then detachably disposed in the machine body through the removable bracket. In the following detailed description of the present invention, the case that the electronic device is a notebook computer and the removable device is a removable bracket carrying a hard disk is taken as an example, but not intended to limit the present invention.

Figure 1:
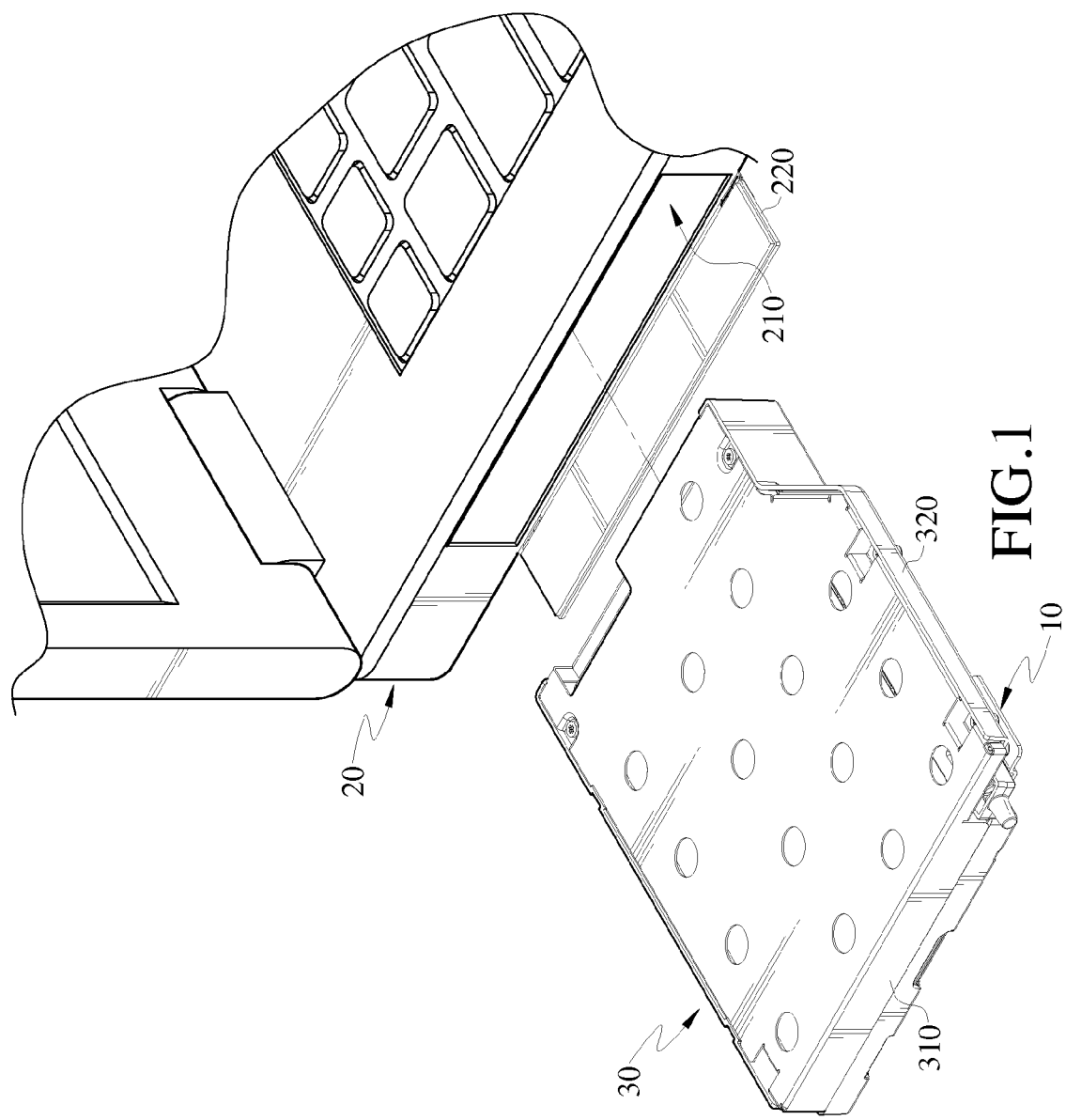
FIG. 1 is a schematic exploded view of a first embodiment of the present invention.
Figure 2:
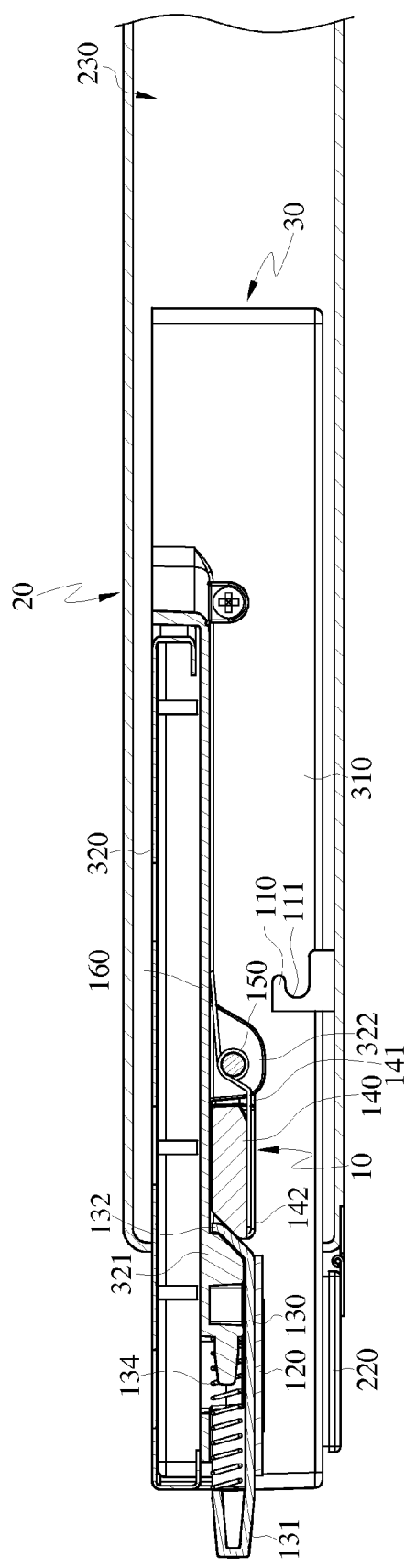
FIG. 2 is a schematic side view of the first embodiment of the present invention.
Figure 3:
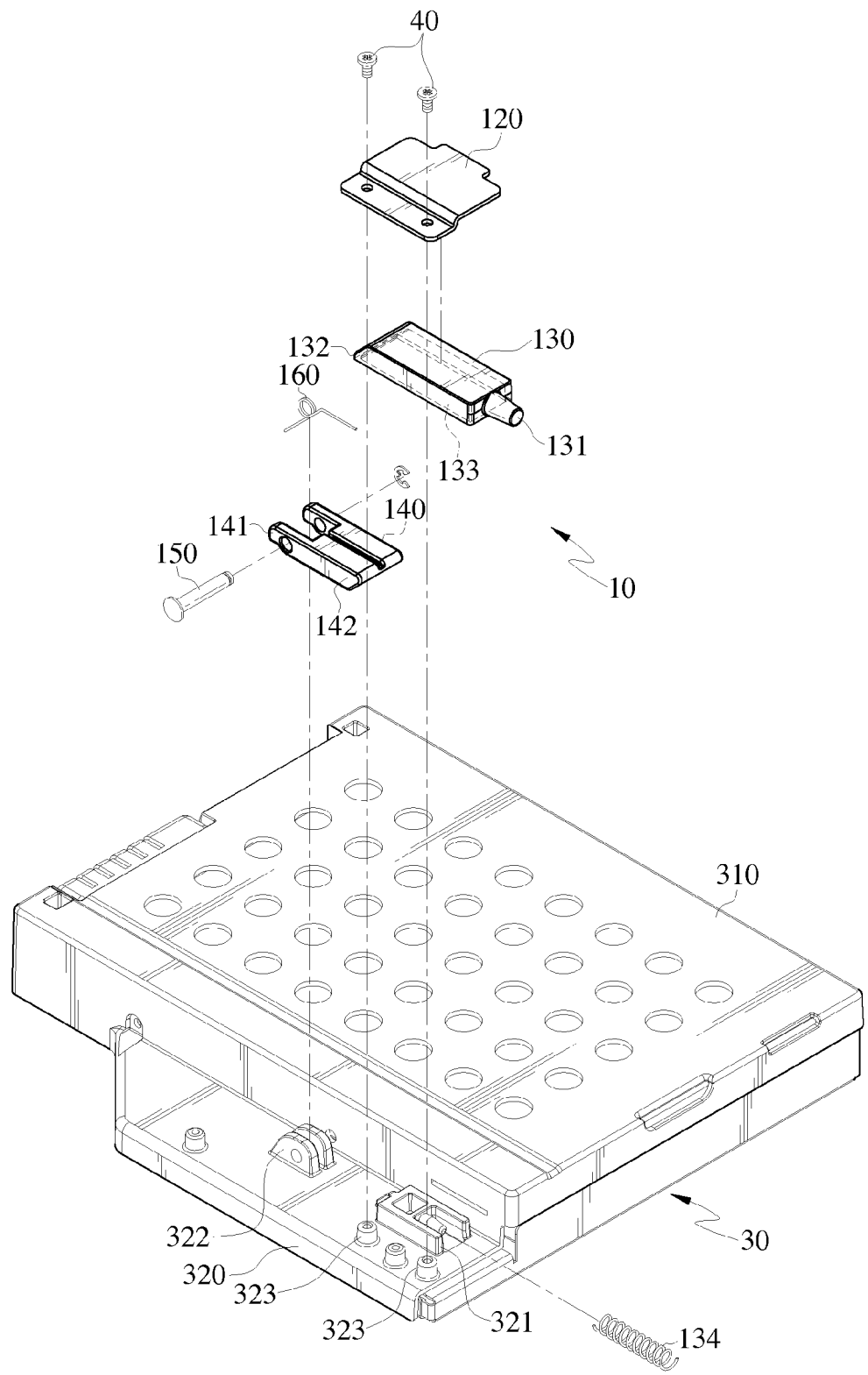
FIG. 3 is a schematic exploded view of a action member and a clipping member according to the first embodiment of the present invention.
Figure 4:
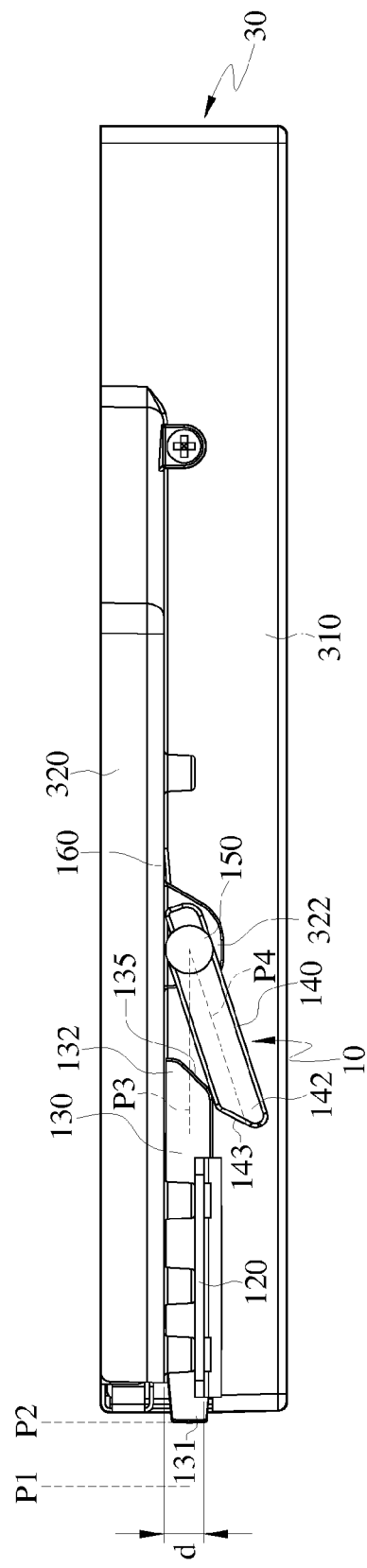
FIG. 4 is a schematic side view of the action member and the clipping member according to the first embodiment of the present invention.

FIGS. 1 to 3 illustrate a stopping mechanism 10 according to a first embodiment of the present invention. As shown in FIGS. 1 to 3, the stopping mechanism 10 is disposed on a machine body 20 and a removable device 30 fitting in with the machine body 20. The machine body 20 has an opening 210 and a door panel 220, and the opening 210 is disposed on a surface of the machine body 20, and is in communication with an accommodating space 230 in the machine body 20. The door panel 220 is pivotally connected to a side edge of the machine body 20 adjacent to the opening 210, and may reciprocatingly rotate and swing relative to the machine body 20, so as to close the opening 210 or expose the opening 210 out of the surface of the machine body 20.

In addition, a torsion spring (not shown) may be disposed between the door panel 220 and the machine body 20, so that the door panel 220 is normally combined to close the opening 210 under an elastic force of the torsion spring. The removable device 30 has a body 310 and a side plate 320 protruding from the body 310, in which the side plate 320 is formed by extending from the surface of the body 310.

The side plate 320 has a combination portion 321 and a pivotal connection portion 322, in which the combination portion 321 and the pivotal connection portion 322 are disposed on the same side surface of the side plate 320 adjacent to the body 310. A hard disk (not shown) is accommodated in the body 310, and the body 310 is used to load the hard disk into the accommodating space 230 from the opening 210 of the machine body 20, so as to form electrical conduction with the machine body 20 through the contact of an electrical connector of the removable device 30 with an electrical contact in the machine body 20 (not shown), or to remove the hard disk from the accommodating space 230 through the opening 210.

Referring to FIGS. 1 to 4 at the same time, the stopping mechanism 10 comprises a stopping member 110, a baffle plate 120, an action member 130, a clipping member 140, and a rotation shaft 150. The stopping member 110 is fixedly disposed on a side surface in the machine body 20 adjacent to the accommodating space 230, and has a notch 111. The notch 111 is disposed on one side of the stopping member 110 opposite to the opening 210 of the machine body 20, and a disposal direction of the notch 111 on the stopping member 110 is different from a disposal direction of the opening 210 on the machine body 20, for example, the disposal direction of the notch 111 is opposite to or inclined at an angle with the disposal direction of the opening 210.

One end of the baffle plate 120 is embedded into a surface of the body 310 of the removable device 30 adjacent to the side plate 320, and the other end of the baffle plate 120 is corresponding to the combination portion 321 and is locked on at least one positioning pillar 323 formed by extending from the side plate 320 with a fastening element 40 such as a screw or a bolt, so that a gap d exists between the baffle plate 120 and the combination portion 321.

The action member 130 has a first end 131 and a second end 132, and has a recess 133 between the first end 131 and the second end 132. The action member 130 is movably disposed in the gap d, and is sleeved on the combination portion 321 of the removable device 30 through the recess 133, so as to rectilinearly move between a releasing position P1 and a pressing position P2 relative to the removable device 30 through an actuation travel provided by the recess 133.

In addition, a first elastic member 134 is disposed in the recess 133. The first elastic member 134 may be, but is not limited to, an elastic object capable of driving the action member 130 to make rectilinear reciprocating displacement such as a compression spring or an extension spring. In this embodiment, the case that the first elastic member 134 is a compression spring is taken as an example, but the present invention is not thus limited. One end of the first elastic member 134 is connected to the combination portion 321 of the removable device 30, and the other end of the first elastic member 134 pushes against the action member 130, so that the action member 130 normally remains at the releasing position P1, and the first end 131 of the action member 130 protrudes from a side edge of the removable device 30.

The clipping member 140 has a connection end 141 and a free end 142. The connection end 141 is connected to the pivotal connection portion 322 of the removable device 30, and the rotation shaft 150 is fixed on the removable device 30 by passing through the pivotal connection portion 322 and the connection end 141, so that the connection end 141 of the clipping member 140 is pivotally connected to the pivotal connection portion 322 of the removable device 30, and thus the free end 142 may reciprocatingly rotate and swing between a starting position P3 and a holder position P4 relative to the removable device 30 by using the connection end 141 as an axle center.

In addition, a second elastic member 160 is provided between the clipping member 140 and the pivotal connection portion 322, and the second elastic member 160 may be, but is not limited to, a torsion spring sleeved on the rotation shaft 150. One end of the second elastic member 160 is fixed on the removable device 30, and the other end of the second elastic member 160 presses against the clipping member 140, so that the free end 142 of the clipping member 140 is close to the side plate 320 of the removable device 30, and is normally kept at the starting position P3, and the free end 142 is corresponding to the second end 132 of the action member 130.

The second end 132 of the action member 130 has a guide surface 135 which is obliquely disposed on the second end 132 in a direction from the side plate 320 of the removable device 30 toward the baffle plate 120, and the free end 142 of the clipping member 140 has an oblique surface 143 matching the guide surface 135.

Figure 5:
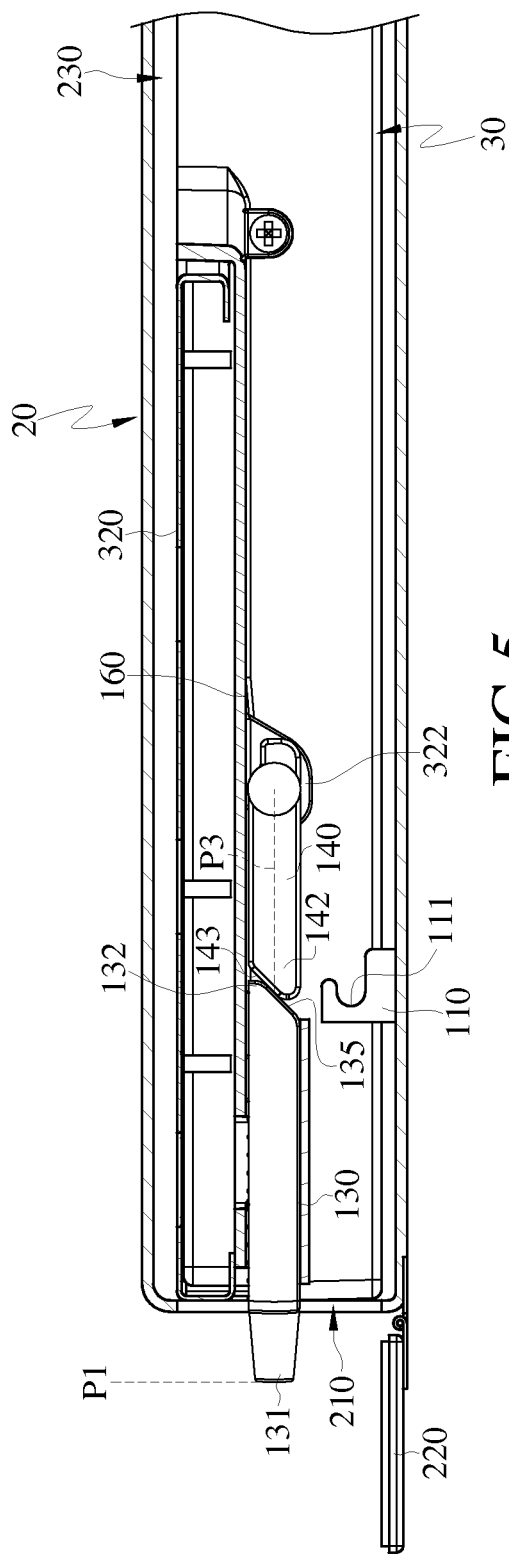
FIGS. 5 and 6 are schematic views of the use state of the first embodiment of the present invention.
Figure 6:
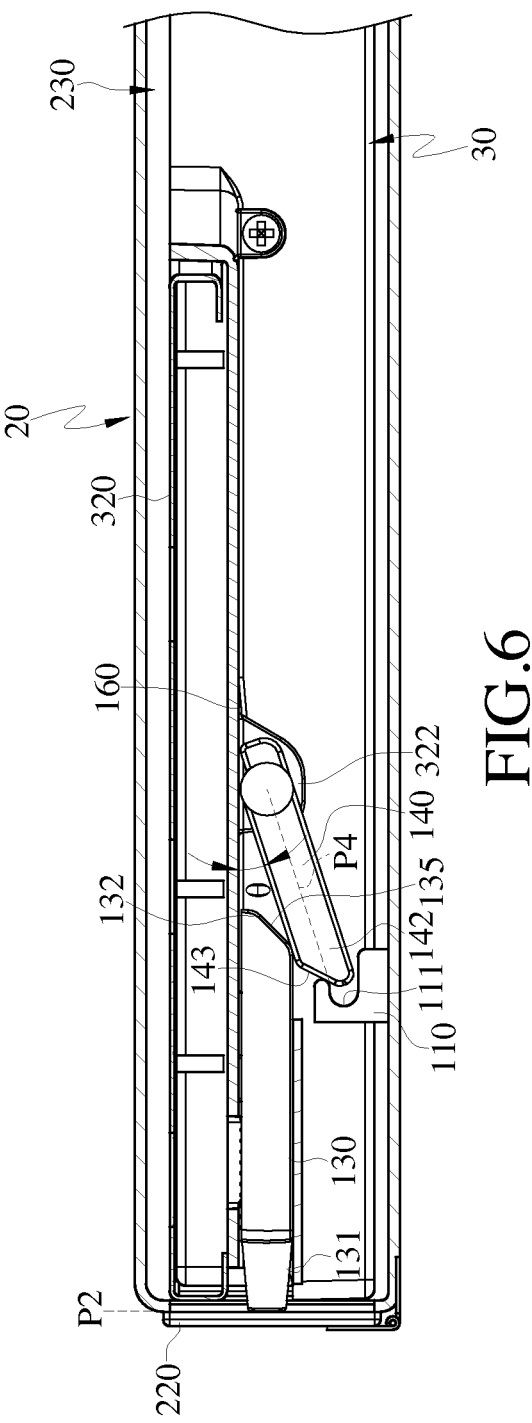

Referring to FIGS. 2, 5, and 6, in use, a user may put the removable device 30 into the accommodating space 230 through the opening 210 of the machine body 20, and enable the contact of the electrical connector of the removable device 30 with the electrical contact in the machine body 20 (not shown). At this time, the clipping member 140 located on the removable device 30 is corresponding to the stopping member 110 fixedly disposed in the machine body 20. Meanwhile, since the action member 130 is located at the releasing position P1 due to the pushing of the first elastic member 134, the first end 131 of the action member 130 normally extends out of the opening 210 of the machine body 20. The clipping member 140 keeps close to the starting position P3 of the side plate 320 of the removable device 30 due to the pressing of the second elastic member 160.

Afterwards, when the door panel 220 is combined to close the opening 210, the door panel 220 pushes against the first end 131 of the action member 130, so that the action member 130 compresses the first elastic member 134 and rectilinearly moves toward the accommodating space 230 along the opening 210, so as to displace to the pressing position P2 from the releasing position P1.

During this process, the second end 132 of the action member 130 contacts the oblique surface 143 of the clipping member 140 with the guide surface 135, and with the continuous movement of the action member 130, the guide surface 135 and the oblique surface 143 press against each other to generate slide, so that the free end 142 of the clipping member 140 rotates toward the stopping member 110 along the side plate 320 of the removable device 30 due to the pushing of the second end 132 of the action member 130.

When the free end 142 of the clipping member 140 rotates to the holder position P4 from the starting position P3, the free end 142 of the clipping member 140 is embedded into the notch 111 of the stopping member 110 and presses against the stopping member 110, and has a tilt angle relation with the side plate 320 of the removable device 30, in which the tilt angle θ is smaller than 90° (as shown in FIG. 6).

Based on the above structure, when the removable device 30 is put into the machine body 20, and the door panel 220 is combined to close the opening 210, a tilt angle is generated between the clipping member 140 and the removable device 30 to support the removable device 30 on the stopping member 110 through the interactive relation among the door panel 220, the action member 130, the clipping member 140, and the stopping member 110, and thus the removable device 30 can form a counterforce support point capable of resisting an external force on the stopping member 110 through the free end 142 of the clipping member 140.

Therefore, when an unexpected external force impacts the machine body 20 toward the opening 210 along the accommodating space 230, since the distance of transmitting the external force to the clipping member 140 is smaller than the distance of transmitting the external force to the action member 130 and the door panel 220, most of the external force is counteracted by the counterforce generated by the clipping member 140 on the stopping member 110 upon reaching the clipping member 140, so that the strength of the external force transmitted to the action member 130 and the door panel 220 is greatly weakened. Therefore, the removable device 30 may be prevented from moving toward the door panel 220 to smash up the door panel 220 and even running out of the machine body 20 from the opening 210.

In addition, if the user needs to replace different peripherals, it is only necessary for the user to turn the door panel 220 to expose the opening 210 out of the machine body 20. At this time, since the pushing force of the door panel 220 acting on the action member 130 disappears, the action member 130 is restored to the releasing position P1 again due to the elastic restoring force of the first elastic member 134. Likewise, since the pushing force of the action member 130 acting on the clipping member 140 disappears, the clipping member 140 is separated from the stopping member 110 and is restored to the starting position P3 due to the elastic restoring force of the second elastic member 160, thus releasing the clipping relation between the removable device 30 and the machine body 20. Therefore, the removable device 30 may be moved out of the machine body 20 through the opening 210 without hindrance (as shown in FIG. 2).

In addition, in the stopping mechanism 10 according to the present invention, the clipping member 140 has a tilt angle relation with the removable device 30 through the cooperation among the door panel 220, the action member 130, the clipping member 140, and the stopping member 110, thus generating a support effect between the removable device 30 and the machine body 20.

Figure 7:
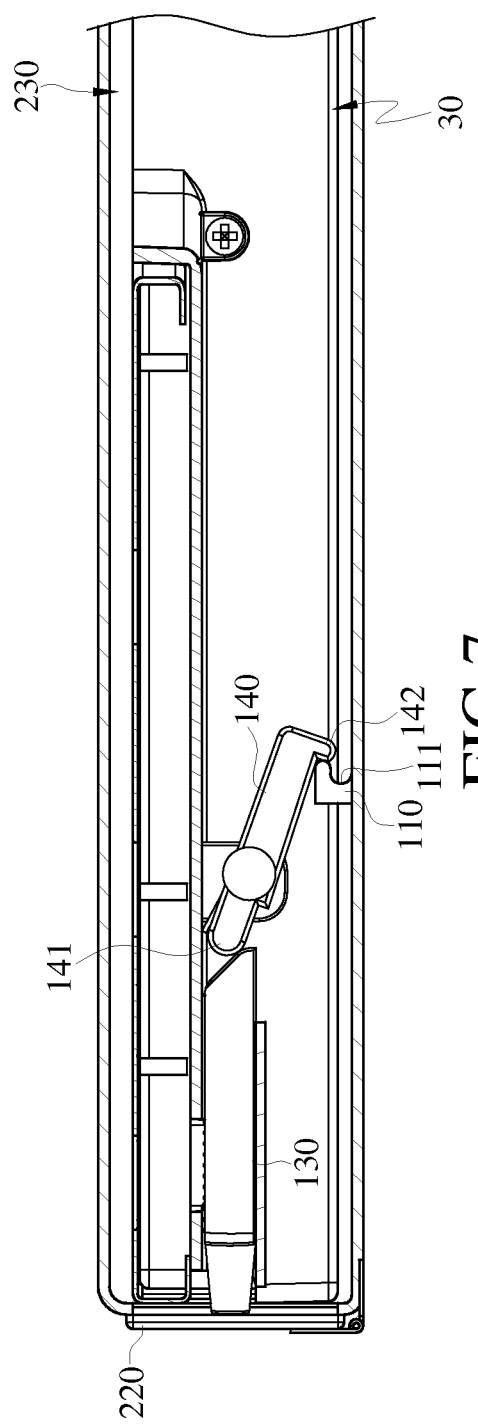
FIG. 7 is a schematic view of the use state of a second embodiment of the present invention.

Therefore, as shown in FIG. 7, in a second embodiment of the present invention, the disposal direction of the clipping member 140 in the first embodiment may be changed, so that the connection end 141 of the clipping member 142 is pushed by the action member 130, and then drives the free end 142 to hook into the notch 111 of the stopping member 110, and thus when the removable device 30 is subjected to an unexpected external force, most of the external force is guided to the stopping member 110 through the clipping member 140, and a counterforce is generated on the stopping member 110, thereby greatly weakening the external force transmitted to the door panel 220 through the removable device 30, which achieves the purpose of preventing the removable device 30 from impacting the door panel 220 due to the external force in the same way.

The efficacy of the present invention is as follows. Through the interactive relation among the door panel, the action member, the clipping member, and the stopping member, after the removable device is disposed in the machine body and the door panel closes the opening, the external force impacting the machine body is guided to the machine body by the clipping member and the stopping member through the tilt angle relation formed by the clipping member supported on the stopping member, thus dispersing the external force acting on the removable device, and therefore the poor electrical signal contact produced between the removable device and the machine body due to shaking is effectively prevented.

At the same time, after most of the external force is absorbed by the machine body, the force of the removable device acting on the door panel is reduced, so that the removable device is fixedly disposed in the machine body, thus preventing the damage of the door panel due to the impact of the removable device.

What is claimed is:
1. An apparatus comprising:
a removable device;
a machine body comprising:

an opening in communication with an accommodating space inside of the machine body for receiving the removable device; and a door panel pivotally connected to a side edge of the machine body adjacent to the opening and movable between an open position exposing the opening and a closed position covering the opening; and a stopping mechanism comprising:

a stopping member, fixedly disposed in the machine body;

an action member, rectilinearly movably disposed on the removable device, wherein the action member is movable between a releasing position and a pressing position; and a clipping member, directly rotatably pivotally connected to the removable device, wherein the clipping member has a starting position and a holder position;

arranged such that when the removable device is received into the accommodating space through the opening and the door panel is moved to the closed position, the door panel pushes the action member to move from the releasing position to the pressing position, causing the action member to drive the clipping member to rotate from the starting position to the holder position, wherein the clipping member presses against the stopping member at an angle relative to the removable device when in the holder position, thereby clipping the removable device in the machine body and providing a counterforce support point relative to the stopping member.

2. The apparatus according to claim 1, wherein the stopping member has a notch, arranged such that the clipping member is embedded into the notch and presses against the stopping member when in the holder position.

3. The apparatus according to claim 1, wherein the action member has a guide surface, the clipping member has an oblique surface, arranged such that when the action member is pushed to move from the releasing position to the pressing position, the guide surface pushes against the oblique surface and drives the clipping member to pivotally rotate to the holder position.

4. The apparatus according to claim 1, wherein the clipping member further comprises a rotation shaft, the removable device comprises a pivotal connection portion, and the rotation shaft passes through the pivotal connection portion and the clipping member at one end of the clipping, such that that the clipping member is pivotally connected to the removable device.

5. The apparatus according to claim 4, wherein the stopping member further comprises an elastic member sleeved on the rotation shaft and connected between the clipping member and the pivotal connection portion, arranged to bias the clipping member to the starting position.

6. The apparatus according to claim 1, wherein the stopping member further comprises a baffle plate, the removable device has a combination portion, the baffle plate is disposed on the removable device with a gap between the baffle plate and the combination portion, and the action member is movable in the gap.

7. The apparatus according to claim 6, further comprising an elastic member disposed between the action member and the combination portion, wherein one end of the elastic member is connected to the combination portion, arranged to bias the action member to the releasing position.

8. The apparatus according to claim 7, wherein the action member has a recess, and the combination portion and the elastic member are accommodated in the recess.

* * * * *